United States Patent
Sanders

(10) Patent No.: US 9,738,565 B2
(45) Date of Patent: *Aug. 22, 2017

(54) METHOD OF REDUCING ATMOSPHERIC AMMONIA IN LIVESTOCK AND POULTRY CONTAINMENT FACILITIES

(71) Applicant: Verdesian Life Sciences, LLC, Cary, NC (US)

(72) Inventor: John Larry Sanders, Leawood, KS (US)

(73) Assignee: Verdesian Life Sciences, LLC, Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/844,245

(22) Filed: Sep. 3, 2015

(65) Prior Publication Data
US 2015/0376075 A1 Dec. 31, 2015

Related U.S. Application Data

(63) Continuation of application No. 13/584,608, filed on Aug. 13, 2012, now Pat. No. 9,145,340.

(51) Int. Cl.
| | |
|---|---|
| C02F 1/28 | (2006.01) |
| C02F 1/66 | (2006.01) |
| C05C 3/00 | (2006.01) |
| C05F 3/00 | (2006.01) |
| C02F 101/16 | (2006.01) |

(52) U.S. Cl.
CPC ............. *C05C 3/005* (2013.01); *C02F 1/285* (2013.01); *C02F 1/66* (2013.01); *C05F 3/00* (2013.01); *C02F 2101/16* (2013.01); *C02F 2209/14* (2013.01); *C02F 2303/02* (2013.01); *Y02P 20/145* (2015.11)

(58) Field of Classification Search
CPC .... C02F 1/20; C02F 1/26; C02F 1/285; C02F 1/288; C02F 1/66; C02F 5/10; C02F 5/105; C02F 5/12; C02F 5/125; C02F 2101/16; C02F 2101/38; C02F 2103/20; C02F 2209/14; C02F 2303/02; C02F 2307/08; C05F 3/00; C05F 3/005
See application file for complete search history.

(56) References Cited

U.S. PATENT DOCUMENTS

| | | |
|---|---|---|
| 2,618,547 A | 1/1950 | Davenport et al. |
| 2,616,849 A | 11/1952 | Giammaria |
| 2,616,853 A | 11/1952 | Giammaria |
| 2,625,471 A | 1/1953 | Mowry et al. |
| 2,625,529 A | 1/1953 | Hedrick et al. |
| 2,652,380 A | 9/1953 | Hedrick et al. |
| 2,976,138 A | 3/1961 | Hester |
| 3,052,648 A | 9/1962 | Bauer |
| 3,087,893 A | 4/1963 | Agius et al. |
| 3,130,033 A | 4/1964 | Stephens |
| 3,222,282 A | 12/1965 | Berkowitz et al. |
| 3,262,919 A | 7/1966 | Bolgiono |
| 3,308,067 A | 3/1967 | Diehl |
| 3,497,334 A | 2/1970 | Gee et al. |
| 3,634,052 A | 1/1972 | Gee et al. |
| 3,639,242 A | 2/1972 | Le Suer |
| 3,685,998 A | 8/1972 | Miller |
| 3,720,765 A | 3/1973 | Miller |
| 3,796,559 A | 3/1974 | Windgassen |
| 3,873,487 A | 3/1975 | Minato et al. |
| 3,936,427 A | 2/1976 | Viout et al. |
| 3,953,191 A | 4/1976 | Barton |
| 3,996,134 A | 12/1976 | Osborn et al. |
| 3,997,319 A | 12/1976 | Ott |
| 4,007,029 A | 2/1977 | Kenton |
| 4,010,006 A | 3/1977 | Price |
| 4,071,400 A | 1/1978 | Jankowiak |
| 4,076,663 A | 2/1978 | Masuda et al. |
| 4,082,533 A | 4/1978 | Wittenbrook et al. |
| 4,083,835 A | 4/1978 | Pohlemann et al. |
| 4,135,887 A | 1/1979 | Rossi |
| 4,161,539 A | 7/1979 | Stallcup |
| 4,165,743 A | 8/1979 | Denning |
| 4,173,669 A | 11/1979 | Ashida et al. |

(Continued)

FOREIGN PATENT DOCUMENTS

| | | |
|---|---|---|
| CN | 1044025 A | 7/1990 |
| CN | 1149239 A | 5/1997 |

(Continued)

OTHER PUBLICATIONS

Groenstein C.M. et al. "Measures to reduce ammonia emissions from livestock manures; now, soon and later" Wageningen UK Livestock Research; Report 488; Jun. 2011.
Prochnow, L.I. et al. "Controlling Ammonia Losses During Manure Composting with the Addition of Phosphogypsum and Simple Superphosphate." Sci.Agri., Piracicaba, 52(2)346-349, mai/ago 1995.
International Search Report and Written Opinion dated Dec. 12, 2013 for PCT/US 2013/054373.
Gay, Susan et al. "Ammonia Emissions and Animal Agriculture." Virginia Cooperative Extension, Publication No. 442-110; 2009; pp. 1-5.
AGROTAIN International LLC White Paper: Maleic-Itaconic Copolymer; available online at talk.newagtalk.com/forums/get-attachment.asp?attachmentid=42697; downloaded Feb. 1, 2017.
AVAIL MSDS dated Jan. 16, 2012.

(Continued)

*Primary Examiner* — Lucas Stelling
(74) *Attorney, Agent, or Firm* — Alston & Bird LLP

(57) ABSTRACT

Methods are provided for the treatment of livestock or poultry confinement facilities equipped with manure collection zones (e.g., a manure pit or litter), in order to reduce and mitigate the effects of gaseous ammonia within the facility. The treatment involves application of an aqueous mixture including a partial calcium salt of a maleic-itaconic copolymer and a partial ammonium salt of a maleic-itaconic copolymer. Preferably, the amount of the partial calcium salt copolymer is greater than the amount of the partial ammonium salt copolymer. The treatment methods provide prompt and lasting reductions in gaseous ammonia within the confinement facility.

16 Claims, No Drawings

(56) References Cited

U.S. PATENT DOCUMENTS

| | | |
|---|---|---|
| 4,211,765 A | 7/1980 | Johnson et al. |
| 4,251,255 A | 2/1981 | Wagner et al. |
| 4,434,231 A | 2/1984 | Jung |
| 4,439,488 A | 3/1984 | Trimnell et al. |
| 4,451,628 A | 5/1984 | Dammann |
| 4,471,100 A | 9/1984 | Tsubakimoto et al. |
| 4,538,532 A | 9/1985 | Coker |
| 4,652,273 A | 3/1987 | Maldonado et al. |
| 4,663,408 A | 5/1987 | Schulz et al. |
| 4,701,204 A | 10/1987 | Duvdevani et al. |
| 4,709,091 A | 11/1987 | Fukumoto et al. |
| 4,725,655 A | 2/1988 | Denzinger et al. |
| 4,808,215 A | 2/1989 | Gill et al. |
| 4,844,725 A | 7/1989 | Malouf et al. |
| 4,872,412 A | 10/1989 | Zollinger |
| 4,897,220 A | 1/1990 | Trieselt et al. |
| 4,923,500 A | 5/1990 | Sylling |
| 4,929,690 A | 5/1990 | Goertz et al. |
| 4,933,098 A | 6/1990 | Gutierrez et al. |
| 4,936,897 A | 6/1990 | Pipko et al. |
| 4,952,415 A | 8/1990 | Winowiski et al. |
| 5,013,769 A | 5/1991 | Murray et al. |
| 5,024,676 A | 6/1991 | Moriyama et al. |
| 5,035,821 A | 7/1991 | Chung et al. |
| 5,047,078 A | 9/1991 | Gill |
| 5,054,434 A | 10/1991 | Wax et al. |
| 5,064,563 A | 11/1991 | Yamaguchi et al. |
| 5,106,648 A | 4/1992 | Williams |
| 5,113,619 A | 5/1992 | Leps et al. |
| 5,135,677 A | 8/1992 | Yamaguchi et al. |
| 5,188,654 A | 2/1993 | Manalastas et al. |
| 5,194,263 A | 3/1993 | Chamberlain et al. |
| 5,210,163 A | 5/1993 | Grey |
| 5,223,592 A | 6/1993 | Hughes et al. |
| 5,256,181 A | 10/1993 | Manalastas et al. |
| 5,294,651 A | 3/1994 | Stephens |
| 5,300,127 A | 4/1994 | Williams |
| 5,328,624 A | 7/1994 | Chung |
| 5,336,727 A | 8/1994 | Okazawa et al. |
| 5,391,632 A | 2/1995 | Krull et al. |
| 5,399,639 A | 3/1995 | Kimpton et al. |
| 5,427,785 A | 6/1995 | Ronson et al. |
| 5,435,821 A | 7/1995 | Duvdevani et al. |
| 5,536,311 A | 7/1996 | Rodrigues |
| 5,562,916 A | 10/1996 | Van Ooijen |
| 5,574,004 A | 11/1996 | Carr |
| 5,578,486 A | 11/1996 | Zhang |
| 5,653,782 A | 8/1997 | Stern et al. |
| 5,666,905 A | 9/1997 | Mackin et al. |
| 5,681,678 A | 10/1997 | Nealey et al. |
| 5,688,907 A | 11/1997 | Wood et al. |
| 5,697,186 A | 12/1997 | Neyra et al. |
| 5,732,658 A | 3/1998 | Wolters et al. |
| 5,741,521 A | 4/1998 | Knight et al. |
| 5,760,150 A | 6/1998 | Bacchus |
| 5,788,722 A | 8/1998 | Emert et al. |
| 5,916,029 A | 6/1999 | Smith et al. |
| 5,993,666 A | 11/1999 | Yamaguchi et al. |
| 5,994,265 A | 11/1999 | Barclay et al. |
| 5,997,602 A | 12/1999 | Aijala |
| 6,022,555 A | 2/2000 | DeLuca et al. |
| 6,057,398 A | 5/2000 | Blum |
| 6,100,221 A | 8/2000 | Poelker et al. |
| 6,100,224 A | 8/2000 | Peiffer et al. |
| 6,139,596 A | 10/2000 | Barth et al. |
| 6,180,589 B1 | 1/2001 | Rodrigues et al. |
| 6,187,074 B1 | 2/2001 | von Locquenghien et al. |
| 6,199,318 B1 | 3/2001 | Stewart et al. |
| 6,207,780 B1 | 3/2001 | Stockhausen et al. |
| 6,221,956 B1 | 4/2001 | Chen |
| 6,228,806 B1 | 5/2001 | Mehta |
| 6,271,191 B1 | 8/2001 | Kerobo et al. |
| 6,287,359 B1 | 9/2001 | Erhardt et al. |
| 6,309,439 B1 | 10/2001 | von Locquenghien et al. |
| 6,312,493 B1 | 11/2001 | Eltink et al. |
| 6,384,166 B1 | 5/2002 | Austin et al. |
| 6,395,051 B1 | 5/2002 | Arnold et al. |
| 6,413,292 B1 | 7/2002 | von Locquengh et al. |
| 6,444,771 B1 | 9/2002 | Yamaguchi et al. |
| 6,471,741 B1 | 10/2002 | Reinbergen |
| 6,488,734 B1 | 12/2002 | Barth et al. |
| 6,500,223 B1 | 12/2002 | Sakai et al. |
| 6,515,090 B1 | 2/2003 | Sanders et al. |
| 6,515,091 B2 | 2/2003 | Sanders et al. |
| 6,544,313 B2 | 4/2003 | Peacock et al. |
| 6,569,976 B2 | 5/2003 | Baxter et al. |
| 6,586,560 B1 | 7/2003 | Chen et al. |
| 6,632,262 B2 | 10/2003 | Gabrielson |
| 6,635,702 B1 | 10/2003 | Schmucker-Castner et al. |
| 6,653,428 B1 | 11/2003 | Klein et al. |
| 6,703,469 B2 | 3/2004 | Sanders et al. |
| 6,734,148 B2 | 5/2004 | Bell et al. |
| 6,770,616 B1 | 8/2004 | McGowan et al. |
| 6,843,846 B2 | 1/2005 | Chatterji et al. |
| 6,844,293 B1 | 1/2005 | Kirby et al. |
| 6,855,182 B2 | 2/2005 | Sears |
| 6,897,184 B2 | 5/2005 | Kurita et al. |
| 6,897,253 B2 | 5/2005 | Schmucker-Castner et al. |
| 6,930,139 B2 | 8/2005 | Sanders et al. |
| 6,936,598 B2 | 8/2005 | Khoo et al. |
| 7,004,991 B2 | 2/2006 | Narayanan et al. |
| 7,019,046 B2 | 3/2006 | Narayanan et al. |
| 7,071,259 B2 | 7/2006 | Botros |
| 7,071,275 B2 | 7/2006 | Rath et al. |
| 7,201,959 B2 | 4/2007 | Judek et al. |
| 7,217,752 B2 | 5/2007 | Schmucker-Castner et al. |
| 7,317,062 B2 | 1/2008 | Pritschins et al. |
| 7,470,304 B2 | 12/2008 | Keenan et al. |
| 7,537,705 B2 | 5/2009 | Mizuno et al. |
| 7,572,328 B2 | 8/2009 | Lettkeman et al. |
| 7,615,521 B2 | 11/2009 | Eveland et al. |
| 7,655,597 B1 | 2/2010 | Sanders |
| 7,666,241 B2 | 2/2010 | Sanders et al. |
| 7,686,863 B1 | 3/2010 | Sanders |
| 7,695,541 B1 | 4/2010 | Frizzell et al. |
| 7,923,479 B2 | 4/2011 | Champ et al. |
| 7,942,941 B2 | 5/2011 | Cravey et al. |
| 8,025,709 B2 | 9/2011 | Sanders et al. |
| 8,043,995 B2 | 10/2011 | Sanders et al. |
| 8,097,076 B2 | 1/2012 | Göbelt et al. |
| 8,110,017 B2 | 2/2012 | Wells |
| 8,143,333 B2 | 3/2012 | Peppmoller et al. |
| 8,163,859 B2 | 4/2012 | Jeon et al. |
| 8,182,593 B2 | 5/2012 | Rapp |
| 8,192,520 B2 | 6/2012 | Sanders |
| 8,420,758 B2 | 4/2013 | Durant et al. |
| 8,430,943 B2 | 4/2013 | Sanders |
| 8,436,072 B2 | 5/2013 | Herth et al. |
| 8,491,693 B2 | 7/2013 | Burnham |
| 8,562,710 B2 | 10/2013 | Palmer et al. |
| 8,592,343 B2 | 11/2013 | Xavier et al. |
| 8,846,817 B2 | 9/2014 | Yontz et al. |
| 9,139,481 B2 | 9/2015 | Sanders |
| 9,145,340 B2 | 9/2015 | Sanders |
| 2001/0002390 A1 | 5/2001 | Rodrigues |
| 2001/0029762 A1 | 10/2001 | Steele et al. |
| 2002/0010296 A1 | 1/2002 | Baxter et al. |
| 2002/0049139 A1 | 4/2002 | Smale |
| 2002/0132886 A1 | 9/2002 | Meffert et al. |
| 2003/0203825 A1 | 10/2003 | Aubay |
| 2003/0225233 A1 | 12/2003 | Dilocker et al. |
| 2004/0202634 A1 | 10/2004 | L'Alloret |
| 2004/0211234 A1 | 10/2004 | Volgas et al. |
| 2004/0226329 A1 | 11/2004 | Sanders et al. |
| 2004/0226330 A1 | 11/2004 | Sanders et al. |
| 2004/0226331 A1 | 11/2004 | Sanders et al. |
| 2004/0230020 A1 | 11/2004 | Sanders et al. |
| 2004/0265266 A1 | 12/2004 | Champ et al. |
| 2004/0266621 A1 | 12/2004 | West |
| 2005/0050931 A1 | 3/2005 | Sanders et al. |
| 2005/0090402 A1 | 4/2005 | Dieing et al. |
| 2005/0158268 A1 | 7/2005 | Schmucker-Castner et al. |
| 2006/0030486 A1 | 2/2006 | Meyer et al. |
| 2006/0069004 A1 | 3/2006 | Song et al. |

(56) References Cited

U.S. PATENT DOCUMENTS

| | | |
|---|---|---|
| 2006/0078526 A1 | 4/2006 | Boyd et al. |
| 2006/0191851 A1 | 8/2006 | Mizuno et al. |
| 2006/0234901 A1 | 10/2006 | Scheuing et al. |
| 2007/0027281 A1 | 2/2007 | Michl et al. |
| 2007/0161524 A1 | 7/2007 | Counradi et al. |
| 2007/0212320 A1 | 9/2007 | Demitz et al. |
| 2007/0213243 A1 | 9/2007 | Yao et al. |
| 2007/0218168 A1 | 9/2007 | Hale, III |
| 2008/0044548 A1 | 2/2008 | Hale, III |
| 2008/0173053 A1 | 7/2008 | Sanders et al. |
| 2008/0189085 A1 | 8/2008 | Cook et al. |
| 2009/0071213 A1 | 3/2009 | Keenan et al. |
| 2009/0149364 A1 | 6/2009 | Beck |
| 2009/0151755 A1 | 6/2009 | Beck |
| 2009/0163365 A1 | 6/2009 | Bentlage et al. |
| 2009/0227451 A1 | 9/2009 | Rose et al. |
| 2009/0258786 A1 | 10/2009 | Pursell et al. |
| 2009/0270257 A1 | 10/2009 | Pursell et al. |
| 2009/0308122 A1 | 12/2009 | Shah |
| 2010/0012040 A1 | 1/2010 | Pow et al. |
| 2010/0024500 A1 | 2/2010 | Tyler |
| 2010/0099566 A1 | 4/2010 | Bobnock |
| 2010/0120617 A1 | 5/2010 | Dyllick-Brenzinger et al. |
| 2010/0122379 A1 | 5/2010 | Dieckmann et al. |
| 2010/0167975 A1 | 7/2010 | Vandermeulen et al. |
| 2010/0175443 A1 | 7/2010 | Sanders et al. |
| 2010/0203228 A1 | 8/2010 | Funaki et al. |
| 2010/0210802 A1 | 8/2010 | Creamer et al. |
| 2010/0234233 A1 | 9/2010 | Sannino et al. |
| 2010/0234506 A1 | 9/2010 | Elizalde et al. |
| 2010/0298526 A1 | 11/2010 | Tsumori et al. |
| 2011/0042318 A1 | 2/2011 | Painter et al. |
| 2011/0048087 A1 | 3/2011 | Sanders et al. |
| 2011/0095227 A1 | 4/2011 | Herth et al. |
| 2011/0146136 A1 | 6/2011 | Waterson et al. |
| 2011/0303157 A1 | 12/2011 | Laubenstein |
| 2012/0004383 A1 | 1/2012 | Laubender et al. |
| 2012/0055414 A1 | 3/2012 | Correa |
| 2012/0065071 A1 | 3/2012 | Li et al. |
| 2012/0118575 A1 | 5/2012 | Griffin |
| 2012/0129749 A1 | 5/2012 | Detering et al. |
| 2012/0129750 A1 | 5/2012 | Detering et al. |
| 2012/0220454 A1 | 8/2012 | Chen et al. |
| 2012/0277099 A1 | 11/2012 | Olson et al. |
| 2012/0277133 A1 | 11/2012 | DiBiase et al. |
| 2013/0090240 A1 | 4/2013 | Yamaguchi et al. |
| 2013/0171737 A1 | 7/2013 | Way et al. |
| 2013/0212739 A1 | 8/2013 | Giritch et al. |
| 2014/0106023 A1 | 4/2014 | Sanders |
| 2014/0106024 A1 | 4/2014 | Sanders |
| 2014/0315716 A1 | 10/2014 | Matheny et al. |
| 2014/0342905 A1 | 11/2014 | Bullis et al. |
| 2015/0033811 A1 | 2/2015 | Sanders |
| 2016/0174547 A1 | 6/2016 | Sanders et al. |
| 2016/0174549 A1 | 6/2016 | Sanders et al. |
| 2016/0175469 A1 | 6/2016 | Sanders et al. |
| 2016/0177004 A1 | 6/2016 | Sanders et al. |
| 2016/0185678 A1 | 6/2016 | Sanders et al. |
| 2016/0272553 A1 | 9/2016 | Sanders et al. |

FOREIGN PATENT DOCUMENTS

| | | |
|---|---|---|
| CN | 1962565 A | 5/2007 |
| CN | 101423431 A | 5/2009 |
| CN | 101519324 A | 9/2009 |
| CN | 101575243 A | 11/2009 |
| CN | 101580409 | 11/2009 |
| CN | 101792348 A | 8/2010 |
| CN | 101830571 A | 9/2010 |
| CN | 101885798 A | 11/2010 |
| CN | 101885888 A | 11/2010 |
| CN | 102154013 A | 8/2011 |
| DE | 2558551 A1 | 7/1977 |
| DE | 2822488 A1 | 11/1979 |
| DE | 4122490 A1 | 1/1993 |
| DE | 4132620 A1 | 4/1993 |
| EP | 0290807 A2 | 11/1988 |
| EP | 0314070 A2 | 5/1989 |
| EP | 0337694 A2 | 10/1989 |
| EP | 0683985 A1 | 11/1995 |
| EP | 0877076 | 11/1998 |
| EP | 0892111 A1 | 1/1999 |
| EP | 0976699 A1 | 2/2000 |
| EP | 1024692 A1 | 8/2000 |
| EP | 1230195 A1 | 8/2002 |
| EP | 2135854 A2 | 12/2009 |
| GB | 1324087 | 7/1973 |
| JP | 54050027 A | 4/1979 |
| JP | 54077294 A | 6/1979 |
| JP | S58131903 A | 8/1983 |
| JP | 60101194 A | 5/1985 |
| JP | 62096046 A | 5/1986 |
| JP | 61282301 A | 12/1986 |
| JP | 63083169 | 4/1988 |
| JP | 63148937 A | 6/1988 |
| JP | 03112426 | 5/1991 |
| JP | H07215746 A | 8/1995 |
| JP | 08092591 A | 4/1996 |
| JP | 11092788 A | 4/1999 |
| JP | 2008023433 A | 2/2008 |
| RU | 2051884 C1 | 1/1996 |
| RU | 2378869 | 1/2010 |
| WO | 9715367 A1 | 5/1997 |
| WO | 9918785 A1 | 4/1999 |
| WO | 9948833 A1 | 9/1999 |
| WO | 2006131213 A1 | 12/2006 |
| WO | 2007003388 A2 | 1/2007 |
| WO | 2009060012 A2 | 5/2009 |
| WO | 2009061930 A1 | 5/2009 |
| WO | 2015031521 A1 | 3/2015 |
| WO | 2015035031 A1 | 3/2015 |
| WO | 2015116716 | 8/2015 |
| WO | 2015179552 | 11/2015 |
| WO | 2015179687 | 11/2015 |

OTHER PUBLICATIONS

Aziz, et al. *Efficiency of Slow Release Urea Fertilizer on Herb Yield and Essential Oil Production of Lemon Balm (Melissa officinalis L) Plant*. American-Eurasian J. Agric. & Environ. Sci., [Online] 5(2) :141-147, 2009.

Sulphur Enhanced Fertilizer (SEF). A new generation of fertilizers. The Proceedings of the International Plant Nutrition Colloquium XVI, Department of Plant Sciences, UC Davis, [Online] 2009.

Chen, et al. *Effect of a Polymer on Mitigating Ammonia Emission from Liquid Dairy Manure*. Efekat polimera na smanjenje emisije /Polj. tehn. (Jan. 2013), 1-13.

Chiba, Lee I. *Animal Nutrition Handbook, Section 12: Poultry Nutrition and Feeding*. pp. 316-331, 2009—available online at http://www.ag.auburn.edu/%7Echilbale/an12poultryfeeding.pdf.

Chien et al. *Review of Maleic-Itaconic Acid Copolymer Purported as Urease Inhibitor and Phosphorus Enhancer in Soils.*. Agronomy Journal 106(2) : 423-430, 2014.

CN Search Report in Application No. 201080047969.4 received with First Office Action dated Jul. 31, 2013.

Davidson et al. *Persistence of Rhizobium japonicum on the Soybean Seed Coat Under Controlled Temperature and Humidity*. Applied and Environmental Microbiology, 35 : 94-96, 1978.

EP Search Report 1 dated Jun. 16, 2016 in related Application No. 13847267.5.

EP Search Report 2 dated Jun. 10, 2016 in related Application No. 16161777.4.

EP Search Report 3 dated Jun. 13, 2016 in related Application No. 16161780.8.

EP Search Report 4 dated Jul. 26, 2016 in related Application No. 16161783.2.

EP Search Report 5 dated Jun. 13, 2016 in related Application No. 16161786.5.

EP Search Report 6 dated Jun. 20, 2016 in related Application No. 16161785.7.

(56) References Cited

OTHER PUBLICATIONS

*Grains/Fertilizers*, article found online at martinsachs.angelfire.com/feeding.html, dated Apr. 11, 2010.
Herrington et al. *Rheological modification of bitumen with maleic anhydride and dicarboxylic acids*. Fuel, 78 : 101-110, 1999.
International Preliminary Report on Patentability 1 in corresponding application PCT/US 2014/052987, dated Mar. 10, 2016.
International Preliminary Report on Patentability 2 in related application PCT/US 2014/054069, dated Dec. 11, 2014.
International Search Report and Written Opinion 1 in related application PCT/US 2010/050244, dated Jun. 27, 2011.
International Search Report and Written Opinion 2 in related application PCT/US 2013/064378, dated Jan. 23, 2014 (Note: for cited reference RU2375063, see U.S. Pat. No. 6,936,598.
International Search Report and Written Opinion 4 in corresponding application PCT/US 2014/052987, dated Jan. 16, 2015.
International Search Report and Written Opinion 5 in related application PCT/US 2014/054069, dated Dec. 11, 2014.
International Search Report and Written Opinion 6 in related application PCT/US 2014/049451, dated Dec. 18, 2014.
International Search Report and Written Opinion 7 in related application PCT/US 2014/039424, dated Oct. 16, 2014.
International Search Report and Written Opinion 8 in related application PCT/US 2015/013345, dated Apr. 13, 2015.
International Search Report and Written Opinion 9 in related application PCT/US 2015/032037, dated Aug. 28, 2015.
International Search Report and Written Opinion 10 in related application PCT/US 2015/031823, dated Aug. 28, 2015.
Jung et al. *Polymer-entrapped rhizobium as an inoculants for legumes*. Plant and Soil, 65 : 219-231, 1982.
Kahraman et al. *Bioengineering Polyfunctional Copolymers. VII. Synthesis and characterization of copolymers of p-vinylphenyl boronic acid with maleic and citraconic anhydrides and their self-assembled macrobranched supramolecular architectures*. Polymer 45 :5813-5828, 2004.
Kejun et al., *Copolymerization of cis-Butenedioic Acid with Sodium Methallylsulfonate in Aqueous Solution*. J. App. Poly. Sci., vol. 40 : 1529-1539; 1990.
Li et al. *Dispersion and Rheological Properties of Concentrated Kaolin Suspensions with Polycarboxylate Copolymers Bering Comb-like Side Chains*. Journal of the European Ceramic Society, 34(1) :137-146, Jan. 2014.
Machida et al. *Water Soluble Polymers. lx. N-(2-chloroethyl)-sulfonamides of Styrene-maleic Acid and Styrene-itaconic Acid Copolymers*. Sen'i Gakkaishi 22(6) :269-73,1996.

Mohan, Prasanthrajan et al. *Addressing the Challenges of Ammonia Loss from Poultry Droppings through Indigenous Carbon Wastes*. International Journal of Environmental Science and Development, 3 (4), Aug. 2012—available online at http://www.ijesd.org/papers/255-D590.pdf.
Naga et al. *Polymeric Additives for Pour Point Depression of Residual Fuel Oils*. J. Chem. Tech. Biotechnol. 35A : 241-247, 1985.
Patterson, Paul H. *Hen House Ammonia: Environmental Consequences and Dietary Strategies*. Multi-State Poultry Meeting, May 14-16, 2002—available online at http://www.ijesd.org/papers/255-D590.pdf.
Powers, Wendy. Practices to Reduce Ammonia. 2004—available online at http://www.thepoultrysite.com/articles/219/practices-to-reduce-ammonia.
Puoci et al. *Polymer in Agriculture: a Review*. American Journal of Agricultural and Biological Sciences, 3 :299-314, 2008.
Sanderson, et al. *Effect of Gypsum and Elemental Sulphur on Calcium and Sulphur Content of Rutabagas in Podzolic Soils*. Can J Plan Sci [Online], pp. 785-788, 2002.
Shakkthivel et al. *Newly Developed Itaconic Acid Copolymers for Gypsum and Calcium Carbonate Scale Control*. Journal of Applied Polymer Science, 103(5) :3206-3213, 2007.
Singh, A. et al. *Efficacy of Urease Inhibitor to Reduce Ammonia Emission from Poultry Houses*. J. Appl. Poult. Res., 18 :34-42, 2009—availble online at http://japr.fass.org/content/18/1/34.full.
*Sodium Lignosulphonate*. Available online at www.xyd-chem.com on Apr. 20, 2010.
US Provisional Patent Application entitled Polyan Ionic Polymers, U.S. Appl. No. 62/001,110, filed May 21, 2014.
Weir, B.S. The current taxonomy of rhizobia. NZ Rhizobia website. http://www.rhizobia.co.nz/taxonomy/rhizobia; Partial update: May 2, 2013.
Yang, Charles Q. et al. *In-situ Polymerization of Maleic Acid and Itaconic Acid and Crosslinking of Cotton Fabric*. Textile Research Journal, 69(10) :782-789, 1999.
Yang, Charles Q. et al. *In-situ Polymerization of Maleic Acid and Itaconic Acid on Cotton: Maldi/Tof Mass Spectroscopy and Light-Scattering Study*. Textile Research Journal, 70(4) :359-62, 2000.
Yanhe et al. *Synthesis and Performance of Itaconic Acid-Maleic Acid Copolymer*. .Indus. Wat. Treat. 2006 10, pagination unknown. DOI: cnki:ISSN:1005-829X.0.2006-10-017.
Yasmin, et al. *Effect of Elemental Sulfur, Gypsum, and Elemental Sulfur Coated Fertilizers on the Availability of Sulfur to Rice*. J Plant Nutr [Online], 20(1): 79-91, 2007.
Zhang et al. *Synthesis and Inhibition Efficiency of a Novel Quadripolymer Inhibitor*. Chin. J. Ch. E. 15(4) :600; 2007.

METHOD OF REDUCING ATMOSPHERIC AMMONIA IN LIVESTOCK AND POULTRY CONTAINMENT FACILITIES

CROSS-REFERENCE TO RELATED APPLICATION

This is a continuation of application Ser. No. 13/584,608, filed Aug. 13, 2012, which is incorporated herein by reference in its entirety.

BACKGROUND OF THE INVENTION

Field of the Invention

The present invention is directed to methods for treating livestock or poultry confinement facilities equipped with manure collection zones, such as pits or litter accumulations, to reduce and mitigate the effects of gaseous ammonia within the facility and thereby lessen the deleterious effects of ammonia on the livestock or poultry within the facility. More particularly, the invention is concerned with such methods wherein an aqueous treatment material comprising a partial calcium salt of a maleic-itaconic copolymer in combination with a partial ammonium salt of a maleic-itaconic copolymer. Such treatments promptly reduce the gaseous nitrogen content within the confinement facilities, and maintain such reductions over a significant period of time.

Description of the Prior Art

Ammonia is a common by-product of animal waste due to the often inefficient conversion of feed nitrogen into animal product. Livestock and poultry are often fed high-protein diets, which contain surplus nitrogen in order to assure that the animals' nutritional requirements are met. Nitrogen that is not metabolized into animal protein is secreted in the urine and feces of livestock and poultry, where further microbial action release ammonia into the air during manure decomposition.

Ammonia is typically considered an indoor air quality concern by poultry and livestock producers, because the gas accumulates inside poorly ventilated and/or managed animal confinement facilities. Elevated levels of nitrogen can have a negative impact on animal health and production, resulting in increased susceptibility of birds to bacterial respiratory infection, and decreased weight gains, feed conversions. Similarly, other livestock suffer under elevated ammonia conditions within a confinement facility.

Producers have adopted a number of strategies to lessen ammonia levels within confinement facilities, especially in cases of poultry coops or houses. Thus, it is known that a variety of amendments including aluminum sulfate (alum), ferrous sulfate, phosphoric acid, and other proprietary products may be sprayed or otherwise applied to the poultry litter. In the case of manure pits beneath livestock barns or houses, producers have principally relied upon ventilation to reduce ammonia levels. However, these methods have not completely solved the ammonia problems inherent in animal confinement facilities.

Specialty Fertilizer Products, LLC, of Leawood, Kans. (SFP), has heretofore commercialized a series of maleic-itaconic copolymers principally for use with solid or liquid ammoniacal or phosphate fertilizers, such as urea or UAN fertilizers, in order to significantly increase the performance of the fertilizers as evidenced by increased yields.

These prior products include Nutrisphere-N® for Liquid Nitrogen Fertilizers, which is a partial calcium salt of a maleic-itaconic copolymer in water with a solids content of at least 30% w/w, and more preferably about 40% w/w. The copolymer is formulated using equimolar amounts of maleic and itaconic moieties. The final product has a pH of 1-2 and is a light brown to yellow viscous liquid.

Another such product is AVAIL® for Liquid Phosphate Fertilizers is a partial ammonium salt of a maleic-itaconic copolymer in water with a solids content of at least 30% w/w, and more preferably about 40% w/w. The copolymer is formulated using equimolar amounts of maleic and itaconic moieties. The final product has a pH of about 2 and is also a light brown to yellow viscous liquid.

SFP has also previously commercialized a manure nutrient manager product under the trademarks More Than Manure® or MTM®, which is primarily designed to reduce phosphorous lock-up and nitrogen loss when applied to manure in an open-air pit or lagoon, or directly onto litter after field application of the litter. MTM® is an aqueous mixture made up of two-thirds by volume Nutrisphere-N® for Liquid Nitrogen Fertilizers and one-third by volume of AVAIL® for Liquid Phosphate Fertilizers, having a solids content of from about 30-60% w/w, a pH of about 3 and a specific gravity of from about 1.1-1.4. Other benefits of the MTM® product include increased crop rotation flexibility, biodegradability, and reduction of manure solids. In such prior uses of MTM®, no odor-reduction studies were conducted, but numerous MTM® users expressed the opinion of a notable reduction of odor from the use of the product.

SUMMARY OF THE INVENTION

It has now been discovered that gaseous nitrogen levels in livestock and poultry confinement facilities can be promptly and significantly reduced for marked time periods by applying an effective amount of a treatment composition to manure within or directly below the facility. Such animal or poultry confinement facilities include upright walls forming an enclosure, a manure collection zone within or below the enclosure, and a roof substantially covering the zone. Examples of such facilities are dairy and hog farrowing, finishing, and calving barns, and poultry coops, barns, and houses. In some instances, the facilities include a manure pit directly below the roof and enclosure, while in others the facilities have a floor covered in litter, which is mixed with animal manures. Usually, the liquid material is applied directly to manure within a pit by simply pouring the product into the manure mass. In the case of litter/manure mixtures, the product is normally sprayed onto the mixture.

The treatment material comprises an aqueous mixture including a partial calcium salt of a maleic-itaconic copolymer and a partial ammonium salt of a maleic-itaconic copolymer. The product typically has a pH of from about 1-5, more preferably from about 2-4. Actual test results confirm very significant reductions in gaseous ammonia within treated livestock or poultry confinement facilities, with a single application lasting for several weeks.

The fact that the treating materials methods of the invention can reduce ammonia levels withing confinement facilities so rapidly and effectively is quite surprising, because no known prior treatment can achieve such results.

DETAILED DESCRIPTION OF THE PREFERRED EMBODIMENTS

The Partial Salt Maleic-Itaconic Copolymers and the Treating Materials

The preferred maleic-itaconic copolymers useful in the invention are described in U.S. Pat. Nos. 6,515,090 and 8,043,995 fully and completely incorporated by reference herein. In general, the copolymer salts should each desirably contain from about 10-90% by weight maleic moieties (more preferably from about 25-75% by weight), and correspondingly from about 90-10% by weight itaconic moieties (more preferably from about 75-25% by weight). Overall, each of the copolymer salts should include at least about 85% by weight of maleic and itaconic moieties, and more preferably at least about 93% by weight. Accordingly, the copolymer salts may also contain other moieties apart from maleic and itaconic moieties, such as vinyl moieties. However, such other moieties should be present only up to a level of about 15% by weight, more preferably up to about 7% by weight. Preferably, each of the copolymer consists essentially of maleic and itaconic moieties. One particularly preferred class of copolymer salts are the SFP AVAIL® and Nutrisphere-N® products described previously, which are formed using substantially equimolar amounts of maleic and itaconic moieties.

Most preferably, each of said partial salt copolymers has the generalized formula

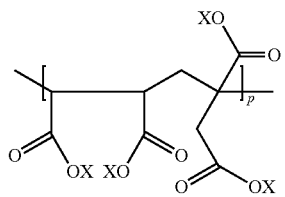

where some of said X cations are H, and others of said X cations are Ca in the case of the partial calcium salt copolymer and ammonium in the case of the partial ammonium salt copolymer, and p ranges from about 10-50.

The partial calcium salt copolymer initially (i.e., before mixing with the partial ammonium salt copolymer) should have a pH of from about 1-4; likewise, the partial ammonium salt copolymer initially should have a pH of from about 1-4. The most preferred initial pH level for both salt copolymers should be about 1-2.

The complete treating materials should preferably contain at least about 30-60% by weight of total copolymer solids derived from both of the partial salt copolymers (more preferably from about 35-50% by weight solids), and from about 40-70% by weight water (most preferably from about 50-65% water). However, the treating materials may also include other ingredients apart from the two partial salt copolymers and water, such as pH adjustment agents, buffering agents, preservatives, and emulsifiers. Any such other ingredients are preferably used at a minor level, e.g., from about 1-10% by weight. The pH of the complete treating materials should be acid, preferably from about 1-5, more preferably from about 2-4.

Preferably, the calcium partial salt copolymer solids should be present in the complete treating materials in an amount greater than the amount of the ammonium partial salt copolymer solids therein. That is, taking the total weight of both copolymer salt solids as 100% by weight, the calcium partial salt copolymer solids should be present at a level of from about 50-80% by weight (more preferably from about 55-75% by weight, and most preferably from about 60-65% by weight), and the ammonium partial salt copolymer solids should be present at a level of from about 20-50% by weight (more preferably from about 25-45% by weight, and most preferably from about 35-40% by weight).

The single most preferred formulation useful in the context of the invention is the previously described MTM® product.

The Preferred Uses of the Treating Materials

Application of the dual partial salt copolymer materials of the invention is quite straightforward. In the case of manure collection pits, the material need only be poured onto the top of the manure and will quite readily spread and diffuse throughout the mass of the manure to promptly reduce the amount of gaseous nitrogen generated and maintained within the confinement facility. In the case of dairy or poultry barns having floor structures with litter and manure atop or mixed with the litter, the treating material is advantageously sprayed onto the top of the litter-manure mixture, with or without mixing. Here again, the action of the treating material is quite prompt and long-lasting.

Generally, the treating mixtures are used at a level of from about 0.005-3 gallons of the material per ton of manure, more preferably from about 0.01-2.5 gallons/ton, still more preferably from about 0.02-1 gallon per ton, and most preferably from about 0.03-0.035 gallon per ton.

Almost immediately upon application of the treating material to the manure, the amount of gaseous ammonia within the confinement facility is perceptibly lowered, and such reduction persists for a considerable time. Generally, the prevailing amount of gaseous ammonia should be reduced by at least about 50% (more preferably at least about 60%) within 24 hours after application. A single treatment also preferably serves to maintain at least about a 30% gaseous ammonia reduction (more preferably at least about 40%) for at least about 14 days (more preferably at least about 21 days).

EXAMPLES

The following examples describe preferred methods in accordance with the invention. It should be understood, however, that these examples are provided by way of illustration only, and nothing therein should be considered a limitation upon the overall scope of the invention.

In these examples, the "treatment" was the preferred MTM® treating agent described above. The ammonia measurements were made using meters having an average data point entry every 10 seconds, and the time in minutes listed in the tables refers to the total time of each reading at multiple points. For example, a reading of "15 mins., 2 points" means that there were two separate measurements at different points, each measurement being over a period of 7.5 minutes. The results of the multiple-point measurements were then averaged to give the reported ammonia levels.

In certain of the examples, the amount of treatment agent is recited as "ounces per acre." This is based upon the manufacturer's recommendation of usage, according to the following equation:

(amount of manure in gallons)/(number of acres to be fertilized with the treated manure)×(18 oz. of MTM®)/(128 oz./gallons)=gallons of MTM® to add to the manure Example 1

In this test, a poultry layer house was treated having approximately 300 tons of litter in the house basement. The litter was treated with 25 gallons of the preferred liquid mixture, which was incorporated into the litter using a composting tractor with a sprayer mounted on the front and supporting a rear tank containing the mixture diluted with 75 gallons of water. Gaseous ammonia levels were determined prior to application of the treatment mixture on Days 1 and 3, on the day of treatment (Day 4), and thereafter on Days 5, 10, 11, and 12. Ammonia measurements were made at the exhaust fan and in the basement, with each measurement being taken three times and averaged. The following are the test results.

| Day | Location/Temp | Treatment | Ammonia ppm |
|---|---|---|---|
| 1 | exhaust 68° F. | None | 22.8 |
| 1 | exhaust 68° F. | None | 55.3 |
| 3 | exhaust 50° F. | None | 85.4 |
| 3 | exhaust 50° F. | None | 84.8 |
| 1 | basement | None | 17.7 |
| 1 | basement | None | 55.3 |
| 3 | basement | None | 172.8 |
| 3 | basement | None | 116.7 |
| 4 | exhaust 27° F. | treated | 8.6 |
| 4 | exhaust 50° F. | treated | 32 |
| 4 | basement | treated | 19.1 |
| 4 | basement | treated | 30.5 |
| 5 | exhaust 55° F. | treated | 15.6 |
| 5 | basement | treated | 17.1 |
| 10 | exhaust 55° F. | treated | 6.8 |
| 10 | exhaust 73° F. | treated | 8.4 |
| 10 | basement | treated | 10.9 |
| 10 | basement | treated | 18.6 |
| 11 | exhaust 61° F. | treated | 15.53 |
| 11 | exhaust 77° F. | treated | 10.1 |
| 11 | basement | treated | 10.1 |
| 11 | basement | treated | 11.8 |
| 12 | exhaust 59° F. | treated | 13.8 |
| 12 | basement | treated | 19.9 |

Example 2

A hog-finishing house having a manure pit with a 250,000 gallon capacity was treated using 18 ounces of the preferred treatment per acre of ground to be fertilized using the treated manure. The treatment was poured onto the top of the manure in the pit, and ammonia readings were taken at the pit exhaust fan prior to and after treatment. The following results were recorded.

| Day | Treatment | Ammonia ppm |
|---|---|---|
| 1 | none | 75 |
| 1 (one hour after treatment, 2 readings averaged) | treated | 33 |
| 7 | treated | 10 |
| 15 | treated | 7 |
| 18 | treated | 5 |

Example 3

A slatted dairy barn with corn cob bedding was treated with the preferred treatment. The manure pit had a 1.2 gallon capacity, and the treatment was applied at 18 ounces per acre (213 acres @ 5600 gallons per acre. Ammonia readings were taken inside the barn at multiple points.

| Day | Details/Location | Treatment | Ammonia ppm (readings averaged) |
|---|---|---|---|
| 1 | within barn, 2 points, 15 mins. | none | 33.0 |
| 2 | within barn, 2 points, 15 mins. | none | 31.4 |
| 2 | within barn, 2 points, 15 mins. | treated | 26.1 |
| 3 | within barn, 4 points, 40 mins. | treated | 22.5 |
| 8 | within barn, 4 points, 40 mins. | treated | 19.2 |
| 28 | within barn, 8 points, 60 mins. | treated | 15.6 |
| 41 | within barn, 8 points, 60 mins. * | treated | 1.3 |

* 20 loads of manure were removed prior to the readings

Example 4

A hog-finishing barn with the manure pit at capacity, was treated using the preferred treatment at 18 ounces per acre.

| Day | Details/Location/Temperature | Treatment | Ammonia ppm |
|---|---|---|---|
| 1 | exhaust fan, 4 points, 15 mins., 75° F. | none | 18 |
| 2 | exhaust fan, 4 points, 15 mins., 61° F. | treated | 9.25 |
| 4 | exhaust fan, 4 points, 15 mins., 83° F. | treated | 8 |
| 8 | exhaust fan, 4 points, 15 mins., 72° F. | treated | 8.1 |

Example 5

A hog finishing barn having a manure pit at 75% capacity was treated at a rate of 18 ounces per acre.

| Day | Details/Location/Temp | Treatment | Ammonia ppm |
|---|---|---|---|
| 1 | exhaust fan, 4 points, 15 mins, 63° F. | none | 7.5 |
| 2 | exhaust fan, 4 points, 15 mins, 61° F. | treated | 8.25 |
| 4 | exhaust fan, 4 points, 15 mins, 80° F. | treated | 3.16 |
| 8 | exhaust fan, 4 points, 15 mins, 67° F. | treated | 4.5 |

Example 6

A hog barn having a manure pit with a 300,000 gallon capacity which was 25% full was treated at a rate of 18 ounces per acre (10 gallons). Before and after treatment, multiple readings were taken inside and outside the barn and averaged, giving the following results.

| Day | Details/Location | Treatment | Ammonia ppm |
|---|---|---|---|
| 1 | inside barn, 2 points, 10 mins. | none | 22.6 |
| 2 | inside barn, 2 points, 10 mins. | none | 44 |
| 3 | inside barn, 2 points, 10 mins. | treated | 32.4 |
| 8 | inside barn, 2 points, 10 mins. | treated | 12.4 |
| 15 | inside barn, 2 points, 10 mins. | treated | 10.0 |
| 19 | inside barn, 6 points, 40 mins. | treated | 15.2 |
| 28 | inside barn, 4 points, 20 mins. | treated | 20.1 |
| 2 | outside barn, 2 points; 15 mins. | none | 87.1 |
| 2 | outside barn, 2 points; 15 mins. | treated | 51.8 |
| 3 | outside barn, 2 points; 15 mins. | treated | 30.7 |
| 8 | outside barn, 2 points; 15 mins. | treated | 12.6 |
| 15 | outside barn, 2 points; 15 mins. | treated | 2.5 |
| 19 | outside barn, 4 points; 15 mins. | treated | 49.8 |
| 28 | outside barn, 4 points; 15 mins. | treated | 9.3 |
| 38 | outside barn, 4 points; 15 mins. | treated | 9.3 |

Example 7

In this example, a hog finishing barn having separate east and west pits was treated at a level of 18 ounces per acre. The results are as follows:

| Day | Details/Location | Treatment | Ammonia ppm |
|---|---|---|---|
| 1 | exhaust fan, 3 points, 15 mins., west half | none | 36 |
| 1 | exhaust fan, 3 points, 15 mins., west half | treated | 19 |
| 7 | exhaust fan, 3 points, 15 mins., west half | treated | 18 |
| 18 | exhaust fan, 3 points, 15 mins., west half | treated | 24 |
| 1 | exhaust fan, 3 points, 15 mins., east half | none | 36 |
| 1 | exhaust fan, 3 points, 15 mins., east half | none | 43 |
| 7 | exhaust fan, 3 points, 15 mins., east half | none | 48 |
| 18 | exhaust fan, 3 points, 15 mins., east half | none | 51 |
| 1 | exhaust fan, 3 points, 15 mins., east half | none | 17 |
| 1 | exhaust fan, 3 points, 15 mins., east half | treated | 15 |
| 7 | exhaust fan, 3 points, 15 mins., east half | treated | 16 |
| 18 | exhaust fan, 3 points, 15 mins., east half | treated | 16 |

Example 8

In this example, the manure pit of a hog finishing barn was treated at a rate of 18 ounces per acre, giving the following results.

| Day | Details/Location/Temp | Treatment | Ammonia ppm |
|---|---|---|---|
| 1 | inside barn, 2 points, 15 mins., 54° F. | none | 10.2 |
| 8 | inside barn, 2 points, 15 mins., 44° F. | treated | 4.5 |
| 1 | exhaust fan, 3 points, 15 mins., 54° F. | none | 15.1 |
| 8 | exhaust fan, 3 points, 15 mins., 44° F. | treated | 7.2 |

Example 9

In this example, another hog finishing barn was treated at a rate of 18 ounces per acre.

| Day | Details/Location/Temp | Treatment | Ammonia ppm |
|---|---|---|---|
| 1 | inside barn, 2 points, 15 mins., 28° F. | none | 6.1 |
| 14 | inside barn, 2 points, 15 mins., 26° F. | treated | 1.9 |
| 1 | inside barn, 2 points, 15 mins., 28° F. | none | 8.2 |
| 14 | inside barn, 3 points, 15 mins., 26° F. | treated | 2.3 |

Example 10

In this test, a hog finishing barn having a manure pit of 300,000 gallons at 85% capacity was treated with 10 gallons of the treatment, yielding the following results.

| Day | Details/Location | Treatment | Ammonia ppm |
|---|---|---|---|
| 1 | exhaust fan, 2 points, 10 mins. | none | 26.5 |
| 1 | exhaust fan, 2 points, 10 mins. | treated | 20 |
| 1 | exhaust fan, 2 points, 10 mins. | treated | 19 |
| 7 | exhaust fan, 4 points, 10 mins. | treated | 12 |

Example 11

In this instance, a dairy barn was treated having no pit. Rather, the preferred treatment was applied using a backpack sprayer at a level of 18 ounces per acre, diluted in 15 gallons of water. The ammonia levels were then tested at various locations in the barn, with the following results.

| Day | Details/Location | Treatment | Ammonia ppm |
|---|---|---|---|
| 1 | gutter | none | 17 |
| 1 | gutter | treated | 12 |
| 1 | gutter | treated | 9 |
| 1 | east end | none | 12 |
| 1 | east end | treated | 9 |
| 1 | east end | treated | 6 |
| 1 | middle | none | 9 |
| 1 | middle, immediately after treatment | treated | 7 |
| 1 | middle, 2 hours after treatment | treated | 6 |
| 1 | west end | none | 9 |
| 1 | west end | treated | 6 |
| 1 | west end | treated | 0 |

Example 12

In this test, a small scale (25'×25') chicken coop was treated. The coop had housed chickens through the winter and had about 1.5 feet of manure with no bedding. The treating agent was sprayed onto the manure bed using 36 ounces of the preferred treatment diluted with 2 gallons of water, followed by additional water over the bed to ensure saturation.

| Day | Details/Location | Treatment | Ammonia ppm |
|---|---|---|---|
| 1 | room average | none | 23.7 |
| 1 | room average | none | 40.9 |
| 9 | room average | treated | 3.5 |
| 14 | room average | treated | 10.5 |
| 21 | room average | treated | 10.5 |

Example 13

In this test, a calving barn was treated using the preferred treatment at a rate of 17 ounces per acre with water, using a backpack sprayer. The results are as follows.

| Day | Details/Location/Temp. | Treatment | Ammonia ppm |
|---|---|---|---|
| 1 | adjacent office 34° F. | none | 1.3 |
| 1 | adjacent office 34° F. | treated | 0.8 |
| 1 | barn, 1° F. | none | 3.8 |
| 1 | barn, 1° F. | treated | 0.3 |

Example 14

In this example, the producer had three hog farrowing barns, two of which were treated at a level of 18 ounces per acre.

| Day | Details/Location | Treatment | Ammonia ppm |
|---|---|---|---|
| 1 | average of 3 barns | none | 22.4 |
| 1 | average of the 2 treated barns | treated | 13.9 |

Example 15

In this test, 2 hog finishing barns, each with a manure pit filled to 25% capacity, were treated at a level of 18 ounces per acre. The manure had a heavy crusting and fly infestation.

| Day | Details/Location/Barn 1 | Treatment | Ammonia ppm |
|---|---|---|---|
| 1 | exhaust fan | none | 14.2 |
| 1 | right side of barn | none | 6.7 |
| 1 | left side of barn (no air movement) | none | 88.4 |
| 1 | exhaust fan, 30 mins. after treatment | treated | 10.7 |
| 1 | right side of barn | treated | 5.1 |
| 1 | left side of barn (no air movement) | treated | 67.0 |

| Day | Details/Location/Barn 2 | Treatment | Ammonia ppm |
|---|---|---|---|
| 1 | exhaust fan | none | 34.2 |
| 1 | right side of barn | none | 13.0 |
| 1 | left side of barn | none | 19.2 |
| 1 | exhaust fan, 30 mins. after treatment | treated | 22.6 |
| 1 | right side of barn | treated | 7.8 |
| 1 | left side of barn | treated | 10.5 |

Example 16

In this example, a hog confinement building with a manure pit containing 100,000 gallons of manure was treated at a level of 18 ounces per acre.

| Day | Details/Location | Treatment | Ammonia ppm |
|---|---|---|---|
| 1 | exhaust fan | none | 7 |
| 1 | exhaust fan after treatment | treated | 6 |
| 1 | exhaust fan, 3 hours after treatment | treated | 0 |

Example 17

In this example, a hog finishing barn was treated at a level of 18 ounces per acre.

| Day | Details/Location | Treatment | Ammonia ppm |
|---|---|---|---|
| 1 | average of 2 exhaust fans | none | 71.8 |
| 2 | average of 2 exhaust fans | treated | 6.0 |

Example 18

In this example, a producer treated the manure pits of 2 hog finishing barns at a level of 18 ounces per acre.

| Day | Details/Location | Treatment | Ammonia ppm |
|---|---|---|---|
| 1 | average of 2 exhaust fans | none | 34.6 |
| 1 | average of 2 exhaust fans, after treatment, 15 mins. between measurements | treated | 12.2 |
| 1 | average of 2 exhaust fans, one hour after application | treated | 8.7 |

I claim:

1. A method of treating a livestock or poultry confinement facility to reduce and mitigate the effects of gaseous ammonia within the facility, said facility having a manure collection zone, upright walls forming an enclosure, and a roof substantially covering said zone, said method comprising the step of applying a treatment material to said manure within said zone in an amount of from about 0.005-3 gallons of said material per ton of manure and effective to lower the concentration of gaseous ammonia within said facility, said material comprising an aqueous mixture including a partial calcium salt of a maleic-itaconic copolymer and a partial ammonium salt of a maleic-itaconic copolymer, said material having a pH of from about 1-5.

2. The method of claim 1, said collection zone comprising a manure pit, and applying step comprising the step of pouring said treatment material into the pit.

3. The method of claim 1, said collection zone comprising a floor structure having litter thereon, with said manure mixed with the litter, said applying step comprising the step of spraying said material onto the manure-litter mixture.

4. The method of claim 1, said level being from about 0.01-2.5 gallons of the material per ton of manure.

5. The method of claim 1, said pH being from about 2-4.

6. The method of claim 1, said material comprising from about 40-80% by weight of partial calcium salt copolymer solids, and from about 20-60% by weight of said partial ammonium salt copolymer solids, with the total amount of the solids taken as 100% by weight.

7. The method of claim 6, said material comprising from about 55-75% by weight of said partial calcium salt copolymer solids and from about 25-45% by weight of said partial ammonium salt copolymer.

8. The method of claim 1, each of said partial salt copolymers having at least about 85% by weight of maleic and itaconic moieties therein.

9. The method of claim 8, each of said partial salt copolymers having at least about 93% by weight of maleic and itaconic moieties therein.

10. The method of claim 9, each of said partial salt copolymers consisting essentially of maleic and itaconic moieties.

11. The method of claim 1, each of said partial salt copolymers comprising from about 10-90% maleic moieties and from 90-10% itaconic moieties.

12. The method of claim 11, each of said partial salt copolymers having substantially equimolar amounts of said maleic and itaconic moieties.

13. The method of claim 1, said material having a solids content of from about 30-60% by weight.

14. The method of claim 1, each of said partial salt copolymers having the generalized formula

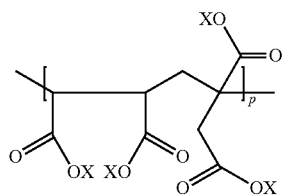

where some of said X cations are H, and others of said X cations are Ca in the case of the partial calcium salt copolymer and ammonium in the case of the partial ammonium salt copolymer, and p ranges from about 10-50.

15. The method of claim 1, said confinement facility selected from the group consisting of dairy, hog, calving, farrowing, and finishing barns, and poultry coops and barns.

16. The method of claim 1, said treating material serving to reduce the amount of gaseous ammonia within said confinement facility by a level of at least about 50% within 24 hours after said application.

\* \* \* \* \*